W. T. CARTER.
COASTER BRAKE HUB.
APPLICATION FILED DEC. 18, 1912.

1,117,975.

Patented Nov. 24, 1914.
2 SHEETS—SHEET 1.

Witnesses:

Inventor
W. T. Carter
By his Attorneys

W. T. CARTER.
COASTER BRAKE HUB.
APPLICATION FILED DEC. 18, 1912.
1,117,975.
Patented Nov. 24, 1914.
2 SHEETS—SHEET 2.
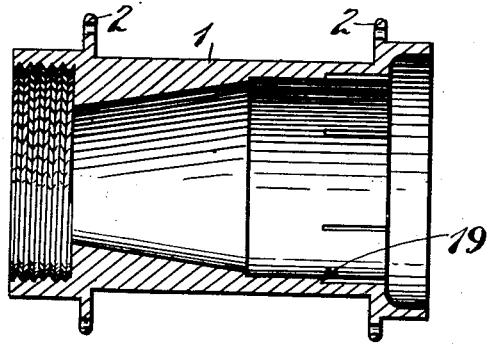
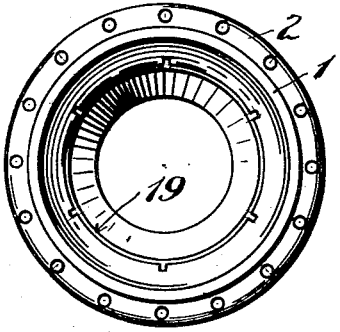
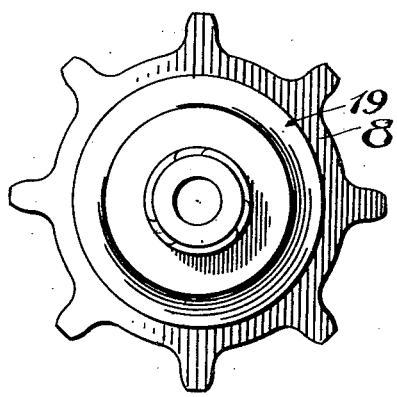
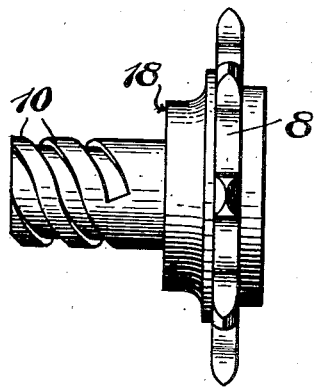
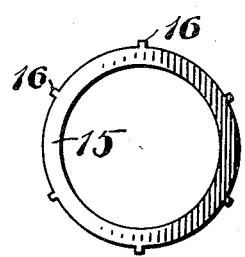
Witnesses:
Inventor
W. T. Carter
By his Attorneys

UNITED STATES PATENT OFFICE.

WALTER T. CARTER, OF LOS ANGELES, CALIFORNIA.

COASTER-BRAKE HUB.

1,117,975.   Specification of Letters Patent.   Patented Nov. 24, 1914.

Application filed December 18, 1912. Serial No. 737,359.

*To all whom it may concern:*

Be it known that I, WALTER T. CARTER, a citizen of the United States, residing at Los Angeles, county of Los Angeles, California, have invented certain new and useful Improvements in Coaster-Brake Hubs, of which the following is a full, clear, and exact description.

My invention relates to an improved coaster brake construction, the object being to simplify the construction and reduce the parts required to the fewest possible number, which parts are of such substantial size as to afford the maximum strength and durability.

Figure 1:
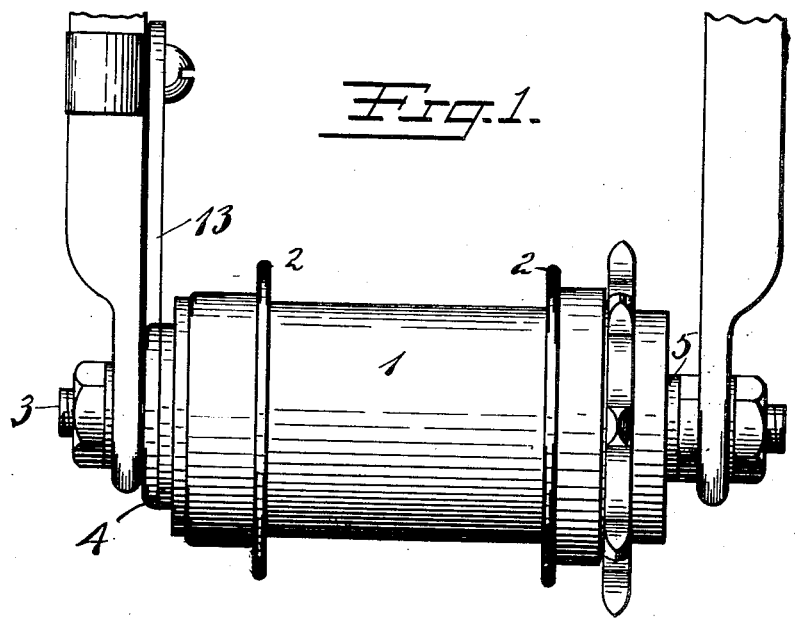
Figure 2:
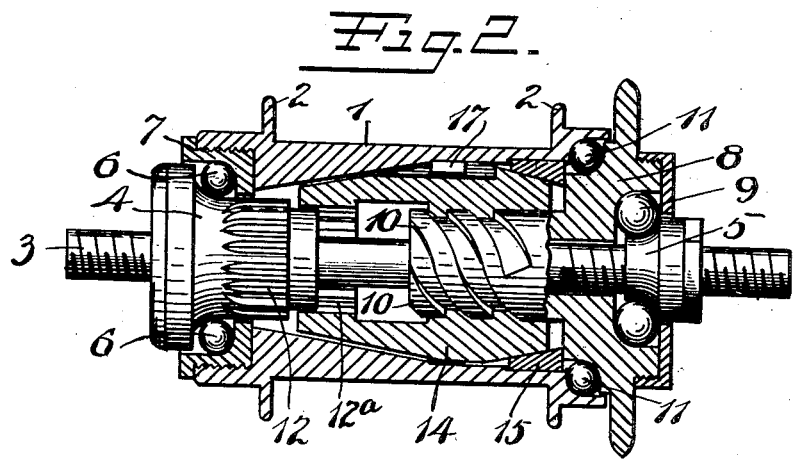

In the accompanying drawings Figure 1 is a plan view of a coaster brake hub as it would appear in place. Fig. 2 is a longitudinal central section of the same. Fig. 3 is a central longitudinal section of the shell, with the other parts detached. Fig. 4 is an end elevation of the shell shown in Fig. 3, looking from right to left. Fig. 5 is an end elevation of the driver element, detached. Fig. 6 is a side elevation thereof. Fig. 7 is a cross section of a detail. Fig. 8 is an end elevation thereof.

1 represents the shell of the hub, having the usual spoke-receiving flanges 2—2.

3 is a central arbor on which are mounted the cones 4—5.

6—6 are balls for the ball bearing which is supported on the cone 4, the adjacent end of the hub shell 1 being provided with a cupped race-way 7 to receive the balls 6.

8 is a driver, so-called, usually provided with sprocket or gear teeth. This driver has a ball-race in one end and is mounted upon the balls 9, which in turn are supported upon the cone 5. The driver has a central forward extension which has spiral threads 10 thereon.

11 are balls which support that end of the hub shell 1 adjacent to the driver 8, suitable ball races being provided in each of said elements for said balls 11. The cone 4 has a forward extension provided with longitudinal splines 12, for the purpose hereinafter described.

13 is an arm on the cone 4, which arm may be suitably locked to the frame of the bicycle, so that said cone cannot rotate and will constitute what I may term a stationary abutment or fixed anchorage.

14 is a barrel-shaped member which constitutes both a coupler and a brake, and which I will term the clutch device. In its former capacity it couples the driver with the hub shell 1 so that the latter may be driven. In its latter capacity it is locked against turning and simultaneously engages with the hub shell to frictionally brake the same. The shell 1 is provided with a sufficiently large chamber to receive the clutch device 14 which moves longitudinally therein on the spiral 10, the interior of the clutch device 14 having corresponding threads which mesh with the spiral threads 10. The opposite end of the member 14 is provided with suitable splines 12ª arranged to engage with the splines 12 on the fixed anchorage abutment at the proper time.

15 is an annular ring which is arranged to fit into the end of the shell 1 between the driver 8 and the clutch device 14. This annulus 15 is provided with suitable splines 16 and the interior of the shell is provided with corresponding grooves to receive said splines whereby said annular member 15 may be readily inserted into its operative position in the end of the shell. The inner wall of the shell at the end adjacent the stationary abutment cone 6 is provided with a tapered seat to correspond with the taper of the adjacent end of the clutch device 14, while the inner wall of the annulus 15 is oppositely tapered to correspond with the tapered wall of the adjacent end of said clutch device 14. By preference the annulus 15 has a slight degree of longitudinal motion in the shell 1.

17 represents the end of a C-shaped drag spring which presses outwardly against the inner wall of the shell and partially surrounds the clutch device 14, the end 17 projecting into a groove in said clutch device 14 so that said spring performs the usual function common to drag springs in devices of this character.

In the preferred construction the driver is provided with an abutment shoulder 18, best seen in Fig. 6, which acts as a stop for the annular member 15, limiting its movement to the right.

When the parts are in the position shown in Fig. 2, which illustrates the driving position, it will be seen that the forward turning of the driver has drawn the clutch device 14 to the right into engagement with the annular member 15. Since the latter is splined or otherwise held against rotation in the hub shell 1, it cannot turn independently of the shell, and hence the forward rotation of the driver 8 will impart a corresponding rotation to the hub shell 1. If the driver 8 is rotated in the reverse direction, it immediately imparts a shifting movement to the clutch device 14 in a direction to the left, which disengages it from the annulus 15 and brings it into engagement with the splines 12 on the stationary abutment, the splines 12ᵃ sliding thereon as the member 14 is moved to the left. This left hand movement of the clutch device 14 may carry with it for a very short distance the ring 15, which quickly comes up against an abutment or knock off shoulder 19 within the shell 1, best seen in Fig. 3. The slight shock of engaging this shoulder 19 tends to knock off the engagement between the ring 15 and the clutch device 14. When the clutch device 14 has been moved sufficiently far to the left, its tapered left hand end engages the correspondingly tapered seat in the inner wall of the shell 1 so as to frictionally retard the rotation of the shell, since the clutch device 14 at such a time cannot turn, owing to its engagement with the splines 12 on the fixed anchorage. The ordinary adjustments may be provided, the adjustment of the bearings being ordinarily effected through the medium of the cone 5, which customarily is screw-threaded upon the arbor 3. It will be seen that by providing the removable ring-like member 15, various parts may be readily assembled, ample room being provided for the insertion into the shell 1 of the relatively large clutch member 14.

What I claim is:

1. In a coaster brake hub, a hub shell having an internal tapered seat at one end and a knock-off shoulder near its opposite end, a ring insertible within the opposite end of said shell by longitudinal movement and means for holding the same against rotation independently of the shell, said knock-off shoulder being so located relatively to said ring as to permit of a slight longitudinal movement of the latter within said shell, said ring having a tapered seat arranged on an incline opposite to the first mentioned tapered seat, a clutch member longitudinally movable between said tapered seats to engage one or the other independently, a driver operatively connected with said clutch for shifting the same longitudinally of the hub shell, means for holding said clutch member against rotation when in engagement with one of said inclined seats and being free of said clutch member when the latter is in engagement with the other of said seats.

2. In a coaster brake hub, a hub shell, a driver entering said shell from one end, a clutch member carried thereby and operatively connected therewith for limited longitudinal and rotary movement relatively thereto, an internal tapered seat at one end of said shell arranged to be frictionally engaged by said clutch member and means within the shell to hold said clutch member against rotation when in engagement with said seat, an internal knock-off shoulder within the shell toward its opposite end, a ring insertible within said opposite end of the shell and arranged to coöperate with said knock-off shoulder, means to cause said ring to revolve with said hub shell, said ring having a limited longitudinal movement within said shell, said clutch member being arranged to make operative connection with said ring, said clutch member being free to rotate with the driver when in operative engagement with said ring.

WALTER T. CARTER.

Witnesses:
E. W. DEIBLER.
O. H. PARKE.